United States Patent [19]

Furr et al.

[11] Patent Number: 4,462,533
[45] Date of Patent: Jul. 31, 1984

[54] METHOD OF RECONDITIONING WELDED JOINTS

[75] Inventors: Samuel T. Furr, Emmaus; Robert E. Bauer, Allentown, both of Pa.

[73] Assignee: Bethlehem Steel Corp., Bethlehem, Pa.

[21] Appl. No.: 391,738

[22] Filed: Jun. 24, 1982

[51] Int. Cl.³ .............................................. B23K 31/00
[52] U.S. Cl. .................................... 228/119; 228/200
[58] Field of Search ............... 29/527.4; 228/196, 200; 427/142, 319, 321; 148/127; 228/119

[56] References Cited

U.S. PATENT DOCUMENTS

| | | | |
|---|---|---|---|
| 3,393,089 | 7/1968 | Borzillo et al. | 117/114 X |
| 3,818,173 | 6/1974 | Zinsser et al. | 228/200 X |
| 3,962,501 | 6/1976 | Ohbu et al. | 427/321 X |
| 3,971,862 | 7/1976 | Fukuoka et al. | 427/321 X |
| 4,140,552 | 2/1979 | Arnold et al. | 427/321 X |
| 4,143,184 | 3/1979 | Paulus et al. | 427/321 X |

Primary Examiner—Nicholas P. Godici
Assistant Examiner—P. Weston Musselman, Jr.
Attorney, Agent, or Firm—John I. Iverson; William B. Noll

[57] ABSTRACT

This invention relates to a combined method of welding and annealing an aluminum-zinc alloy coated ferrous wire, and restoring the corrosion resistant properties to the annealed areas of said wire. The aluminum-zinc coating consists of an alloy overlay and an intermetallic alloy layer, between said alloy overlay and the ferrous wire. The preferred method includes the steps of (1) upset welding two alloy coated steel wires, (2) annealing the weld joint, at a temperature between about 1200° and about 1450° F. whereby during such annealing the weld joint is subjected to brushing to remove said alloy overlay and to prevent the formation of oxides on said intermetallic alloy layer, (3) removing the burr formed during such welding, and (4) cooling. During said cooling, or alternatively by reheating to a maximum temperature where the aluminum-zinc alloy coating on the wire begins to melt, i.e. about 900° F. (482° C.), a flux and lead-free, Zn-containing solder stick or wire is repeatedly moved along the weld joint to further disrupt and remove any oxide remaining thereon while depositing a new corrosion resistant coating comprised of said Zn-containing solder.

5 Claims, 1 Drawing Figure

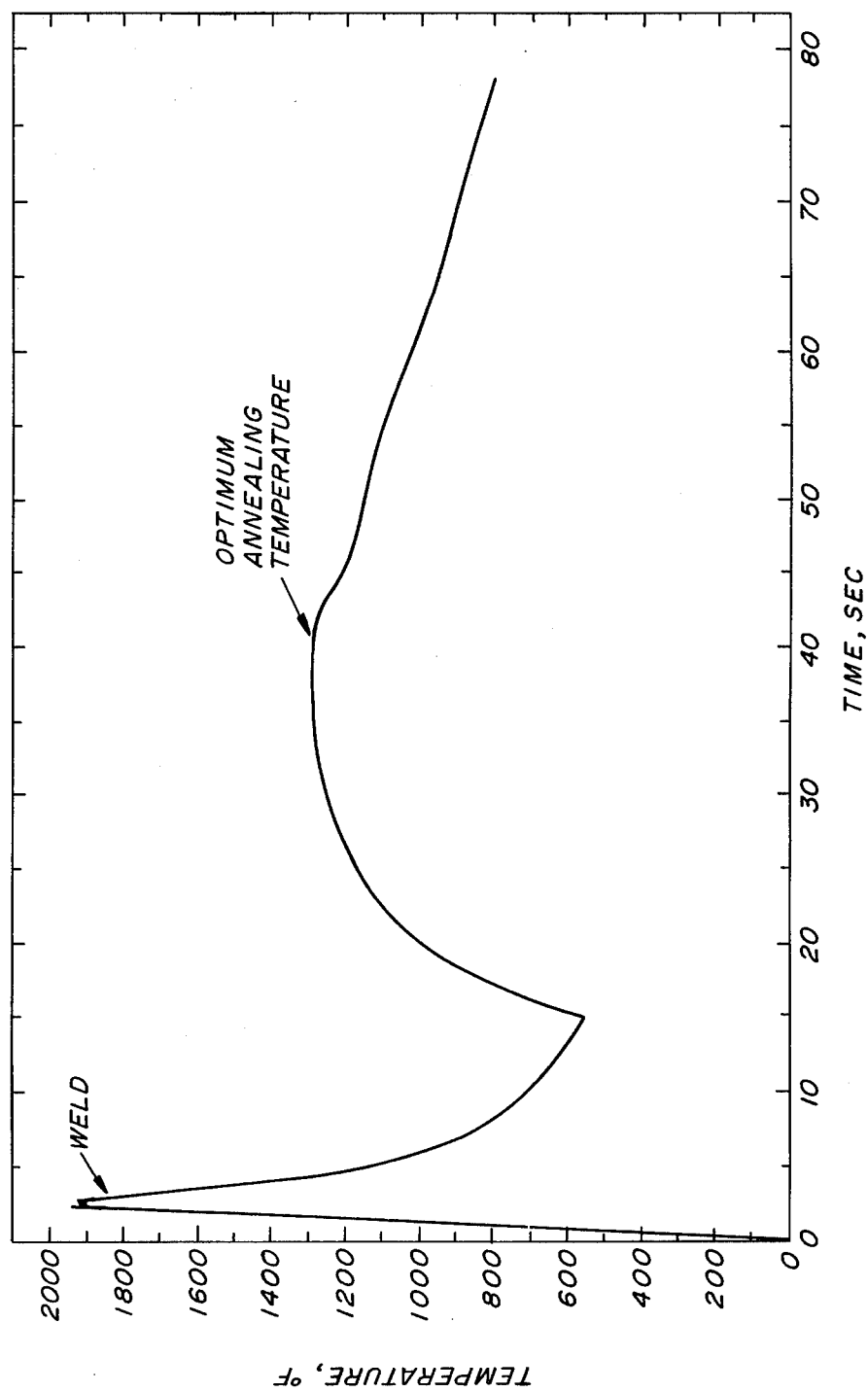

METHOD OF RECONDITIONING WELDED JOINTS

BACKGROUND OF THE INVENTION AND DISCUSSION OF PRIOR ART

This invention is directed to a method for reconditioning welded joints of a continuous ferrous strand having a coating thereon comprised of an aluminum-zinc alloy. More particularly, this invention relates to a method of (1) welding aligned, Al-Zn alloy coated ferrous wires, (2) annealing the welded joint, and (3) restoring the corrosion resistant properties to the annealed joint area.

The commercial success of a metallic coated wire, dictated in large measure by ASTM specifications and customer requirements, requires that welded joints of such coated wire be suitably reconditioned to provide (1) atmospheric corrosion resistance substantially equivalent to that of the coated wire, and (2) improved ductility to allow for bending of the coated wire. In addition to the property of improved ductility or flexibility, there are the further desirable product qualities of coating smoothness, appearance and adherence.

The prior art, as represented by the references below, does not teach a method of suitably reconditioning the welded joint of aluminum-zinc alloy coated wire, nor to achieve the desirable coating qualities needed for a commercially viable product.

1. ASTM standard, Designation A780-80, describes a procedure for the repair of damaged hot-dip galvanized coatings. Section A1 specifically refers to the use of zinc-based alloys for such repair. The procedure includes the steps of (a) suitably cleaning the area to be reconditioned, which cleaning may comprise mechanical means, such as wire brushing, (b) preheating said area to a temperature in the range of 600° to 750° F. (315° to 400° C.) while wire brushing the surface of the area, (c) rubbing the preheated area with a repair stick to deposit an evenly distributed layer of the zinc-base alloy, and, (d) cleaning the repaired area, such as by the use of water to remove flux residue.

2. U.S. Pat. No. 2,101,816 (McBride) for "Galvanizing Composition" is directed to a flux-metal composition to repair damaged galvanized coatings. The composition, to be applied to the damaged area at a temperature of 500° to 600° F. (260° to 315° C.), comprises an alloy of lead, tin and zinc, admixed with a flux capable of dissolving metal oxide.

3. U.S. Pat. Nos. 2,150,929 and 2,255,979 (Kohler) relate to methods for repairing damaged galvanized coatings. The methods include the step of protecting the damaged areas by amalgamating mercury, alone or with lead, respectively, with the protective zinc coating. No preheating of the damaged areas is required for these repair techniques.

The present invention represents an effective method of reconditioning a welded area in an aluminum-zinc alloy coated product by restoring the corrosion resistant properties thereof, while improving the core properties. The prior art, as exemplified by the above references, fail to provide an effective manner of achieving the dual goals of this invention.

INCORPORATION BY REFERENCE

This application incorporates by reference the specification and drawings of U.S. Pat. Nos. 3,343,930 and 3,393,089 to Borzillo et al and 3,782,909, to Cleary et al, each of which are assigned to Bethlehem Steel Corporation, the assignee of this application.

SUMMARY OF THE INVENTION

The present invention is directed to a method of welding and annealing an aluminum-zinc alloy coated ferrous strand, and restoring the corrosion resistant properties to the annealed areas of said strand. More particularly this invention is directed to reconditioning weld joints in ferrous wire coated with an alloy of 25% to 70%, by weight, aluminum, balance essentially zinc, where the coating consists of an aluminum-zinc alloy overlay and an intermetallic alloy layer, said intermetallic alloy layer being between said alloy overlay and the ferrous wire. The preferred method includes the steps of (1) upset welding two aligned aluminum-zinc alloy coated steel wires, (2) annealing the weld joint, such as by electric resistant heating, at a temperature between about 1200° to 1450° F. (649° to 788° C.), whereby during such annealing the weld joint is subjected to brushing to remove said alloy overlay and to prevent the formation of oxides on said intermetallic alloy layer, (3) removing the burr, formed during such welding, and (4) cooling. The weld joint of the wire is then reheated to a temperature of about 800° to 1000° F., or until the aluminum-zinc alloy coating begins to melt, and a lead-free, Zn-containing solder stick is applied to the weld joint to deposit a new corrosion resistant coating comprised of said lead-free, Zn-containing solder. During the application of the solder stick, the weld area is subjected to wire brushing to achieve coating smoothness and good coverage. The resulting wire, having a corrosion resistant metallic coating about the weld area, may be bent tightly around a mandrel without marring the coating along the weld area.

BRIEF DESCRIPTION OF DRAWING

The FIGURE is a time-temperature curve for the thermal history of the method of welding, annealing and reconditioning the welded joint of Al-Zn alloy coated wire according to one embodiment of this invention.

DETAILED DESCRIPTION OF PREFERRED EMBODIMENT

This invention is directed to a method of reconditioning the welded joint of a metallic coated ferrous strand, such as an aluminum-zinc alloy coated steel wire, to restore at the welded area the (1) corrosion resistant properties of the coating and (2) mechanical properties of the ferrous strand. Aluminum-zinc alloy, as used herein for a coating, means an alloy having a composition consisting essentially of, by weight, 25% to 70% Al, Si in an amount not less than 0.5% of the Al content, balance essentially zinc, and a microstructure having an alloy overlay and an intermetallic layer intermediate said overlay and the underlying ferrous core. See U.S. Pat. Nos. 3,343,930 and 3,393,089 for a more detailed discussion of such coating alloy.

In the production of continuous strands of metallic coated wire, it is often necessary to join such coated wire, typically in the form of a coil of some intermediate length, with a coil of like coated wire. That is, coil ends are butt or upset welded by aligning the wire ends and bonding such ends through the application of heat and pressure, a practice well known in the art. However, to make such new extended coil a commercially acceptable product requires a procedure to satisfactorily recondition the weld joint to make the weld joint area compatible with the adjacent unaffected areas of the wire. Other factors, not so apparent in the finished strand, are production considerations. Lead and flux, typically ingredients used in repair sticks by weld reconditioning practices followed today, are not only hazardous to the operator, but may leave a corrosive residue on the joint area which should be removed. A flux residue can be removed but a leaded residue cannot. The present invention describes a method of providing such satisfactorily reconditioned welded joint while avoiding the production problems associated with the existing conventional procedures.

In the practice of this invention, as illustrated by the thermal history in the accompanying FIGURE, two aluminum-zinc wires are upset welded at a temperature of above about 2000° F. (1093° C.), a procedure well known in the art. One consequence of such welding procedure is the creation of a burr in the immediate area of the weld joint. Furthermore, because the wire core is typically a high carbon-steel (by weight, up to 0.90%), hard and brittle transformation products may form in the weld zone. As a result of these consequences of the welding step, the weld area is subjected to localized annealing, such as by electric resistance heating, to a temperature in the range of about 1200° to 1450° F. (649° to 788° C.). The burr can be more easily removed when the wire is in an annealed state, and the core must be softened to increase the ductility of the welded wire. In any case, during said anneal, as soon as the peak temperature is reached, the surfaces of and adjacent to the weld area are subjected to brushing to remove the alloy overlay and to prevent the formation of oxides on the intermediate alloy layer. Finally, with heat still remaining in the wire the burr is removed. As the wire cools from said anneal, a repair stick is applied to the surface of the weld area at a wire temperature of about 900° F. to coat said surface. Concurrent with the application of the repair stick, the freshly applied coating is moved and intermixed with the aluminum-zinc alloy coating remaining on the wire adjacent the weld area. The movement is preferably accomplished by wire brushing; however, it may be possible to gain sufficient movement of the coating by the mere application of the repair stick itself. The repair stick, for the purposes of the method of this invention, comprises zinc or zinc alloy, such as Zn-Sn and Zn-Al, which is free of lead and flux. Suitable repair sticks which provide adequate corrosion resistant properties to the welded area, and which may be applied at temperatures within the range of between about 800° to 1000° F. (427° to 438° C.), may be selected from such compositions, by weight percent, as 60Sn-40Zn, 91Sn-9Zn, 95Zn-5Al, and 100Zn.

As the wire continues to cool, the freshly applied coating, i.e. repair stick to the weld area, is solidified and the wire cooled to room temperature. Since the mass of the wire to be repaired may be too small to provide for sufficient residual heat in the wire to permit the repair in a continuous operation, see the FIGURE, after cooling from the anneal and removal of the burr, the wire may be reheated to a temperature between the temperature at which the repair stick begins to melt and 900° F. (482° C.), and the repair made as above. In either situation, the repair temperature is critical. If the repair temperature is too high there is a tendency to form rather thick, brittle intermetallic phases in the coating which will easily flake-off when the wire is subjected to a bend. A repair temperature which is too low will not allow adequate movement of the existing aluminum-zinc overlay.

While appearance and smoothness of the coating on the reconditioned weld may be readily determined by visual inspection, a critical test of the joint is a wrap test. Such a test determines coating adherence. Typically, the ratio of the mandrel (diameter) to wire (diameter) is about 4 or 5 to 1. For example, a 0.120 inch diameter wire section would be subjected to a wrap test about a mandrel having a diameter of ⅝".

It was discovered during the development of the method of this invention that coating adherence is dependent on the annealing temperature as well as the temperatures of the joint repair procedures. The relationship of coating adherence to the annealing temperature was determined in a series of tests in which the annealing temperature was varied, and the resulting wires subjected to a wrap test. For this series of tests, 0.120 wires coated with 55Al-1.6Si—balance zinc were welded, end to end, and the joint formed thereby subjected to the preferred method disclosed herein, except for the annealing temperature. The selected annealing temperature for each test, and the results thereof, are listed in TABLE I.

TABLE I

| Anneal. Test | Est. Max. Anneal Temp. °F. | Mandrel Test* | |
|---|---|---|---|
| | | Wire Ductility | Coating Adherence |
| 1 | 1240 | pass/fail | good |
| 2 | 1270 | pass | good |
| 3 | 1290 | pass | good |
| 4 | 1310 | pass | good |
| 5 | 1360 | pass | good |
| 6 | 1410 | pass | good |
| 7 | 1440 | pass | good/fair |
| 8 | 1460 | pass | fair |
| 9 | 1480 | pass | fair |
| 10 | 1565 | pass | fair/poor |
| 11 | 1615 | pass | poor |

*⅝" diameter mandrel

Table I indicates that a minimum annealing temperature above about 1200° F. (649° C.) is necessary to insure adequate ductility in the wire at the welded joint. Unexpectedly, however, it was discovered that when the annealing temperature exceeds about 1440° F. (782° C.), coating adherence on the subsequently repaired and wrapped wire is reduced. Thus the annealing temperature should fall within the range of about 1200° to about 1450° F. (649° to 788° C.), preferably within the range of 1250° to 1420° F. (677° to 771° C.).

The criticality of the annealing temperature may be explained in part by the following. It will be recalled that the method of this invention is directed to the process of welding and annealing an aluminum-zinc alloy coated ferrous wire, and of restoring the corrosion resistant properties to the annealed areas of said wire. The as-cast, aluminum-zinc alloy coating, prior to welding and annealing, comprises an aluminum-zinc alloy overlay and a thin intermetallic layer intermediate said overlay and the ferrous wire. While such alloy encompasses an alloy comprising, by weight, 25 to 70% Al, Si in an amount of at least 0.5% based on the Al content, balance essentially Zn, a commercial coating alloy is one containing 55% Al, 1.6% Si, balance Zn. In the development of such alloy, particularly the commercial composition, it was discovered that silicon was necessary to make a hot-dip coated product, as the presence of silicon in the aluminum-zinc suppressed the formation of a thick, brittle intermetallic layer in the coating of the aluminum-zinc alloy coated product. Such a discovery contributed significantly to the development of the commercial product, whereby such product possessed a ductile, adherent coating. The result was a coated product having a thin intermetallic layer which was flexible, thereby enabling the coated product to be formed without flaking of the coating.

However, it was discovered in the investigation leading to this invention that at high annealing temperatures, above about 1470° F. (799° C.) the intermediate layer begins to "break out" and grow toward the surface of the coating, such that at 1700° F. (927° C.) nearly the entire overlay is consumed by the intermetallic layer. With such a growth in the intermetallic layer the coating is transformed from a ductile state to a brittle state. In such a brittle state the coating will flake off when the coated product is bent or formed such as around a mandrel. Clearly then high annealing temperatures can be detrimental to the aluminum-zinc coatings, and therefore to the products coated thereby.

Having established the criticality of the annealing step, another critical feature of the method of this invention is the initiation of wire brushing of the weld area during the cooling thereof from the peak annealing temperature. As state previously, the purpose of such brushing is to remove the alloy overlay and to prevent the formulation of oxides on the intermetallic layer. It is believed that the removal of the overlay to expose the intermetallic layer uncovers a firm foundation for the subsequently applied repair coating.

Specific Embodiment—Preparation

To illustrate the method of this invention, two sections of an aluminum-zinc alloy coated steel wire, the composition of coating and steel base, by weight %, being as follows:

| Coating (.8 mil thick) | Steel (0.120 inch diameter) |
|---|---|
| 55 - Al | 0.61 C |
| 1.6 - Si | 0.84 Mn |
| bal. - Zn | 0.009 P |
|  | 0.014 S |
|  | 0.16 Si |
|  | 0.036 Al |
|  | bal. Fe, | were subjected to the following sequential steps:

(a) the ends of the coated wire sections were cut to present squared ends suitable for mating end-to-end, (b) the coated wire sections were then aligned, placed in a welding fixture and upset welded to form a single section, (c) such single section was placed between electrified annealing jaws and annealed at a temperature of about 1300° F., (d) After reaching the peak anneal temperature of 1380° F., the surface of the welded joint was subjected to brushing with a wire brush, i.e. hand tube-roughing brush having bristles 1⅝" long by 0.013" diameter, to remove the alloy overlay and to prevent the formation of oxides on the intermetallic layer adhering to the steel wire, (e) the brushed wire section was then permitted to cool in air, however, during such cooling the burr, formed during said welding, was removed. For repair of the welding joint, the wire section was reheated, and (f) brushing of the joint was resumed, and at a temperature of about 900° F. (482° C.), a solder repair stick was applied to the joint area, where the repair stick was an alloy comprising 40% Zn and 60% Sn, free of lead and flux, and (g) after further cooling of the welded wire the freshly applied coating of 40 Zn-60 Sn solidified.

Specific Embodiment—Product Evaluation

Inspection of the coated weld joint revealed a smooth coating. Good adherence of the coating was confirmed by wrapping the welded wire about a ⅝" mandrel—no flaking of the coating was observed.

Since a purpose of the joint reconditioning method of this invention is to restore corrosion resistant properties to such joint, 0.375 inch diameter, Class 45 aluminum-zinc alloyed coated wires, welded, annealed, and repaired as above, were spirally wound into a seven (7) wire strand and subjected to a laboratory salt-spray test. By way of background, the salt spray test, designated as ASTM Standard B117-73, is an industry accepted, accelerated laboratory test procedure for simulating the suitability of a product to withstand the harsh conditions of a coastal atmosphere high in salt water moisture. Based on experience gained with testing spiral strands of welded wire joints repaired by conventional techniques, an aim performance level of 2500 hours was established for this Class 45 Al-Zn alloy coated wire in such a salt spray test. In two separate tests of repaired joints, the life of the repaired coating at the joints far exceeded the 2500 hours aim, specifically 3250 and 3450 hours, respectively. Thus, the corrosion resistant properties had been restored by the method according to this invention.

We claim:

1. A method of welding and annealing an aluminum-zinc alloy coated ferrous wire, where the coating thereof consists of an aluminum-zinc alloy overlay and an intermetallic alloy layer, said intermetallic layer being between said alloy overlay and the ferrous wire, and reconditioning the welded area to restore the corrosion resistant properties to said area, comprising the steps of bringing together two sections of said coated wire into solid contact to form a continuous wire, welding said sections to form a welded area, annealing said welded area by heating the continuous strand to a temperature between 1200° to 1450° F., brushing said welded area to remove said alloy overlay and to prevent the formation of oxides on said intermetallic alloy layer while the continuous wire is at a temperature above about 1200° F., cooling said continuous wire, reheating said continuous wire to a weld repair temperature between about 800° and 1000° F., applying to said welded area a repair stick of a zinc containing alloy free of lead and flux, and cooling said continuous wire to room temperature whereby a coating of said zinc alloy is caused to solidify about said welded area.

2. The method according to claim 1 wherein the disruption of the formation of a nonferrous oxide layer is effected by a wire brush.

3. The method according to claim 1 wherein said continuous wire is formed by butt welding two such wires, and that a burr formed as a result of welding is removed prior to the application of the zinc containing alloy to the welded area.

4. The method according to claim 2 wherein said aluminum-zinc alloy comprises, by weight, 25% to 70% Al, at least 0.5% Si based on the aluminum content, balance essentially Zn.

5. The method according to claim 3 wherein said zinc alloy is selected from the group consisting of Zn-Al and Zn-Sn.

* * * * *